(12) United States Patent
Knapp et al.

(10) Patent No.: US 7,293,594 B2
(45) Date of Patent: Nov. 13, 2007

(54) PROCESS FOR THE PRODUCTION OF SANDWICH ELEMENTS FROM REACTIVE PLASTICS MATERIAL

(75) Inventors: Ulrich Knapp, Odenthal (DE); Jürgen Wirth, Köln (DE)

(73) Assignee: Henneick GmbH, Leverkusen (DE)

( * ) Notice: Subject to any disclaimer, the term of this patent is extended or adjusted under 35 U.S.C. 154(b) by 36 days.

(21) Appl. No.: 11/213,004

(22) Filed: Aug. 26, 2005

(65) Prior Publication Data

US 2006/0124223 A1 Jun. 15, 2006

(30) Foreign Application Priority Data

Sep. 1, 2004 (DE) .................. 10 2004 042 270

(51) Int. Cl.
*B29C 44/30* (2006.01)
*B32B 27/40* (2006.01)

(52) U.S. Cl. .............. 156/549; 156/78; 156/582; 425/4 C; 425/224; 425/817 C; 264/46.2; 264/46.5

(58) Field of Classification Search ............ 156/78, 156/79, 497, 500, 549, 582; 425/4 C, 224, 425/817 C; 264/45.8, 46.2, 46.5, DIG. 13
See application file for complete search history.

(56) References Cited

U.S. PATENT DOCUMENTS

| 3,977,931 A | * | 8/1976 | Peille ........................ 156/78 |
| 4,267,135 A | | 5/1981 | Stroud et al. ................ 264/51 |
| 5,114,755 A | * | 5/1992 | Canaday et al. ........... 427/373 |
| 5,144,755 A | * | 9/1992 | Braun et al. ................ 34/560 |
| 5,665,286 A | | 9/1997 | Sulzbach et al. .......... 264/46.2 |

FOREIGN PATENT DOCUMENTS

GB 1 267 313 3/1972

* cited by examiner

*Primary Examiner*—Jeff H. Aftergut
*Assistant Examiner*—Michael A Tolin
(74) *Attorney, Agent, or Firm*—Lyndanne M. Whalen

(57) ABSTRACT

The invention relates to a process for the production of sandwich elements (so-called panels), in which the rising reactive mixture is guided, when it rises, through guide elements arranged between the upper and lower outer layers. This process produces void-free panels having a regular cell structure. The invention also relates to an apparatus useful for the production of such sandwich elements.

10 Claims, 3 Drawing Sheets

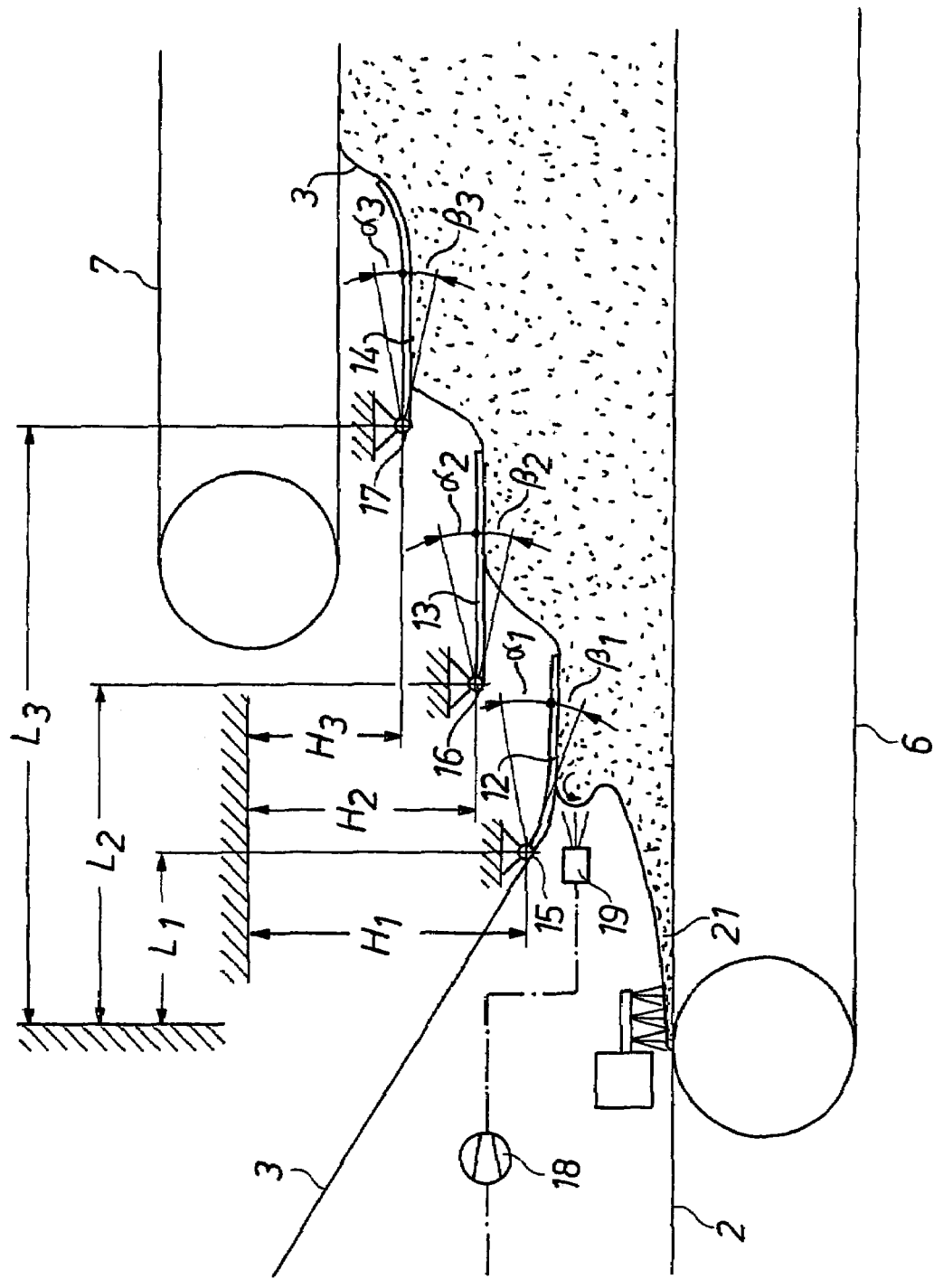

PROCESS FOR THE PRODUCTION OF SANDWICH ELEMENTS FROM REACTIVE PLASTICS MATERIAL

BACKGROUND OF THE INVENTION

The present invention relates to a process for the production of sandwich elements (so-called panels) in which the ascending reactive mixture is led, when it rises, through guide elements arranged between the upper and lower outer layers, and in this way void-free panels having a regular cell structure can be produced. The invention also relates to an apparatus for their production.

The production of sandwich elements (panels) from reactive plastics material is generally carried out in a continuous process. In this connection, the panels are produced in an endless manner on devices such as that which is commercially available from Hennecke under the name Contimat, in thicknesses of 10 to 200 mm. Such a device normally consists of a circulating upper belt for guiding the upper outer layer, a circulating lower belt for guiding the lower outer layer, a feed device for the upper outer layer, a feed device for the lower outer layer, a forming section within which the reactive mixture, e.g. a polyurethane reaction mixture or polyisocyanurate reaction mixture, foams between the upper outer layer and the lower outer layer and fully reacts, a device for cutting the produced panel into the desired lengths, as well as a metering station with a mixing head for applying the polyurethane reaction mixture to the lower outer layer. An example of such a prior art device is shown in FIG. 1.

In this connection, the liquid reactive mixture is applied to the lower belt i.e. to the lower outer layer. The application is effected by means of a mixing head running transverse to the transporting direction. Since the mixture applied in this way is not completely flat, the reactive mixture rising due to the blowing gas that is subsequently produced forms an irregular and uneven (rough) surface forms. When this reactive mixture with the uneven (rough) surface reaches the upper belt, i.e. the upper outer layer, air is trapped between the uneven surface or humps and the upper belt. Panels with voids are thus formed. Such panels are unsuitable for use in technical applications since they have clearly recognizable voids, and because such panels are significantly distorted due to the voids and they become crooked. Panels with voids on the upper side are formed especially if the production is, as the practitioners say, too fast (i.e., the transporting velocity of the outer layers for the instantaneously metered amount of reactive mixture is too high). Such an operating mode corresponds to the rise curve a of the reactive mixture as shown in FIG. 2.

In practice, it has now been found that surface voids can be avoided by lowering the production rate, in other words by lowering the transport velocity of the outer layers for the same metered amount of reactive mixture. In this case, the foam front between the outer layers exhibits a so-called bow wave. Such an operating mode corresponds to the rise curves b and c in FIG. 2. This so-called bow wave is characterized by a depression or hollow formed in the transporting direction of the outer layers caused by the foam front rising between the outer layers over the height of the reactive mixture. In such an operating mode, the irregular surface of the rising reactive mixture no longer occurs.

The rise curve b illustrated by way of example in FIG. 2 corresponds to an operating mode with a production rate driven relatively too slowly. Although the occurrence of voids is avoided in this case, significant "overrolls" are formed in the panel.

The essential physical data that determine the quality of a panel are the compressive strength and the insulating effect.

During the development of propellant gas in the reactive plastics material, cells are formed that are elongated, i.e. substantially oval, corresponding to the direction of ascent. Panels with a homogeneous cell structure in which the cells are aligned vertically (i.e., substantially perpendicular to the panel outer layers) are now desired. This is because the loading capacity of cells in the longitudinal direction (i.e., parallel to their long sides) is significantly higher than transverse thereto. Accordingly, panels in which the substantially oval cells are formed perpendicular to the outer layers have the best compressive strength values. In this connection, the number of cells is normally in the range from about 10 to about 100 cells per cm, i.e., the height of a vertically aligned cell is generally of the order of magnitude of about 0.1 to 1 mm.

The same applies to the insulating effect. The smaller the heat conductor cross-section and the longer the heat conductor paths of the cell membranes in the plastics matrix, the better the insulation. This also means that a cell structure with cells aligned substantially vertically to the outer layers represents the optimum structure. This in turn means that overrolls, such as occur in a procedure corresponding to the rise curve b illustrated in FIG. 2, leads to a cell structure with completely randomly arranged cells, i.e. to cells that for a large part do not lie perpendicular to the outer layers. This in turn means that such panels exhibit too low an insulating effect and also have too low a compressive strength, particularly on the upper side of the panel.

A compromise which has been adopted in practice is to drive a production rate (i.e., adjust a transporting velocity of the outer layers) that leads to a rise curve resembling the rise curve c in FIG. 2. This practice minimizes the void size and the void frequency and the thickness of the overroll layer (i.e., the thickness of the panel edge layer in which the cells are chaotically arranged) is not very pronounced.

Such a compromise is technically still reasonably feasible with slowly reacting plastics, such as some polyurethane foams (PUR foams), in which the foam rises relatively slowly. However, the compressive strengths and insulating effects in the PUR foams produced in this way are still not always completely satisfactory.

With highly reactive plastics, such as polyisocyanurate foams (PIR foams), this compromise is however no longer technically reasonably feasible. Due to the extremely rapid rise of the PIR foam, a rise curve resembling the rise curve b in FIG. 2 occurs quasi-automatically. A process window for a production similar to the rise curve c in FIG. 2 is not possible in practice and a procedure corresponding to the rise curve a in FIG. 2 has to be avoided in principle on account of the formation of voids.

With PIR foams, until now, one has had to be satisfied with compressive strengths and insulating effects that do not correspond to the optimum values of this material.

EP-A-689 920 describes a process and an apparatus with which rectangular slabstock foams or foam sheetings can be produced from a liquid foam or from a foamable reaction mixture. This disclosure discusses the problem of on the one hand distributing the foamable mixture uniformly over the width of the transporting belt, and on the other hand of preventing air inclusions when the upper laminating film is applied.

EP-A-689 920 teaches the use of a deflecting element (i.e., in principle a calibration plate) with which the mixture can be distributed, and positioning this deflecting element in the transporting direction so that the rise of the foam takes place only after the exit of the foamable mixture from the channel between the deflecting element and lower belt. This means that even if a liquid foam (froth) is used as the reactive mixture, the actual rise process from the chemical reaction only starts behind the deflecting element.

The process and apparatus described in EP-A-689 920 are ideally suited for the production of slabstock foam. In this case, block heights of 1 to 2 m are in fact produced.

Serious defects are found, however, in the production of panels according to the process of EP-A-689 920. The panels have in fact only a thickness of 0.01 to at most 0.2 m, resulting in completely different production conditions.

When using unfrothed reactive mixture, the distance between the deflecting element (e.g. calibration plate) and lower belt must be of an order of magnitude of about 0.3 to 8 mm. This can be achieved only with an extremely high technical effort, particularly for thin panels, since the distance of, for example, 0.3 mm must be exactly maintained over the whole surface of the deflecting element. If this is not the case, large density differences occur in the panel, which in turn leads to distortion and thus to rejects.

When using frothed reactive mixture this problem is less serious, since in this case the distance between the deflecting element and the lower belt is larger, corresponding to the froth portion.

However, another serious problem arises in this case. When the pre-frothed reactive mixture flows through the calibration channel, cells in the froth are destroyed due to the friction, which then collapse and lead to the formation of gas pockets. Thus, although in this case air inclusions are indeed avoided, new gas pockets are produced.

Further, EP-A-689 920 does not disclose that in panels the cells have to be vertically arranged relative to the outer layers in order to obtain optimal compressive strength and optimal insulating effect or how this is to be achieved.

SUMMARY OF THE INVENTION

The object of the present invention is therefore to provide a simple process and a simple apparatus with which void-free and distortion-free panels can be produced from cellular reactive plastics materials with high compressive strength and high insulating effect, i.e. panels with a cell structure in which the cells are formed substantially elongated and are aligned substantially perpendicular to the outer layers.

This object applies to PUR foams (polyurethane foams), but in particular to PIR foams (polyisocyanurate foams).

This and other objects which will be apparent to those skilled in the art are accomplished by positioning a guide element between the outer layers of the panel as described more fully below.

BRIEF DESCRIPTION OF THE DRAWINGS

FIG. 3 shows an apparatus according to the invention for the production of sandwich elements of cellular reactive plastics material, in which three intermediate stages are arranged between the upper and lower outer layers.

DETAILED DESCRIPTION OF THE INVENTION

Figure 1:
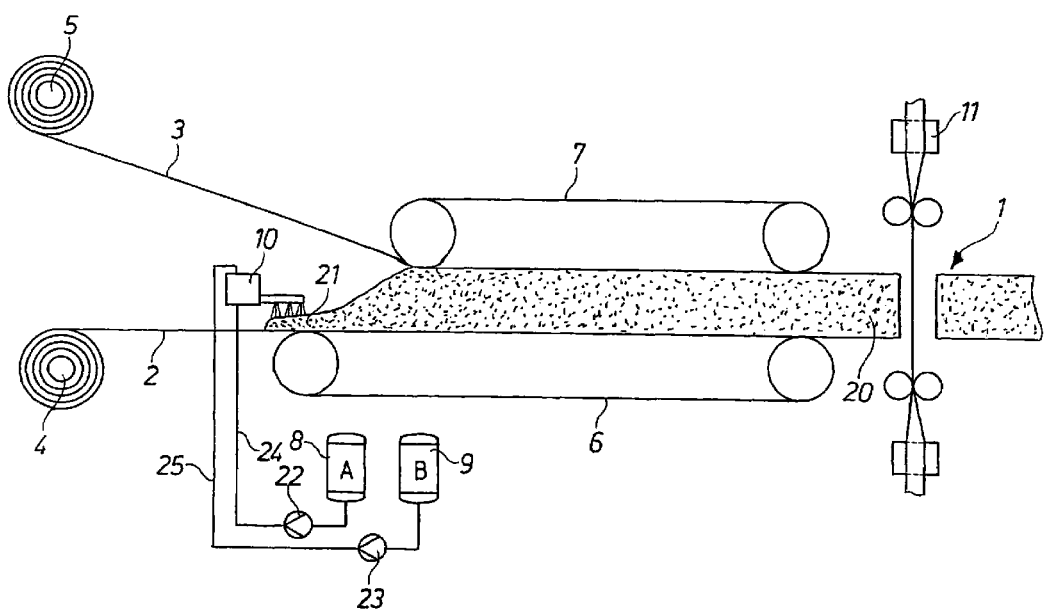
FIG. 1 shows an apparatus for the production of sandwich elements of cellular reactive plastics material according to the prior art.

The invention relates to a process for the continuous production of sandwich elements containing an upper outer layer (upper facing layer) and a lower outer layer (lower facing layer) and a layer of cellular reactive plastics lying there between and securely joined to the outer layers, in which a) the two outer layers are continuously conveyed in the longitudinal direction so that a gap extending in the longitudinal direction of the outer layers is formed between the said outer layers, and b) the reactive mixture is applied to the lower outer layer, and c) the outer layers with the reactive mixture are then led in a forming section in which the thickness of the sandwich element is adjusted and in which the reactive mixture completely reacts, and d) the completely reacted sandwich element is then removed, in which e) at least one guide element extending over the width of the outer layers is arranged between the outer layers, and the rising reactive mixture contacts the at least one guide element from below before it reaches the upper outer layer.

The solution of the problems encountered with prior art processes for the production of panels may be attributed to the fact that the process of the cell structure formation takes place in at least two stages. The rising reactive plastics material has to (a) contact from underneath at least one intermediate stage which is vertically bounded by a guide element and (b) flow along the lower side of that intermediate stage before it contacts the upper outer layer.

In this connection, the height and length as well as the angular position of the guide element(s) are preferably adjusted so as to lead to the formation of a distinct bow wave in the foam front of the reactive mixture underneath the guide element(s), i.e. that the rising foam front of the reactive mixture between the lower outer layer and the at least one guide element exhibits over its height a bulge or arching formed in the transporting direction of the outer layers. This bulge or corrugation thus extends substantially transversely over the whole width of the foaming reactive mixture.

The bow wave, which due to its rotation removes the air between the uneven surfaces or humps of the rising reactive plastics material and thus equalizes the surface, is no longer formed as before on the upper outer layer where the reactive plastics material hardens and where a cell structure with randomly oriented cells then remains. The bow wave is pre-formed on at least one guide element at a time when the reactive mixture is still creamy, but the cell stabilization has already progressed to such an extent that the cells are no longer destroyed when they flow along the guide element.

The void-free, creamy reactive mixture then leaves this at least one vertical intermediate stage formed by the guide element, additional blowing gas is formed and the blowing gas expands further and the cells expand. The direction of ascent is substantially perpendicular to the direction of the upper belt and to the upper outer layer.

This second rise of the reactive plastics material causes the still randomly lying cells at the height of the at least one guide element to align themselves corresponding to their lines of ascent, so that panels with a homogeneous cell structure are formed. In this connection, the elongated, substantially oval cells are then aligned substantially vertically, i.e. perpendicular to the outer layers of the sandwich element.

Depending on the rise behavior and the reactivity of the reactive plastics material as well as on the amounts of blowing gas, the rising and cell-forming reactive plastics material reaches the vertical intermediate stage generated by the at least one guide element preferably within a defined period of time. In this case, the lower time, i.e. the earliest time, is defined such that the ascending reactive mixture has double the volume of the originally-applied reactive mixture. The upper time, i.e. the latest time, is defined such that the reactive mixture has approached the upper outer layer up to a vertical distance corresponding to the height of 3 to 5 vertically aligned cells. With a normally-adjusted cell size in the range from 0.1 to 1 mm, this corresponds roughly to a vertical distance of 0.3 to 5 mm. For the practical determination of the upper time, the height of the vertically-aligned cells can be determined by simple rise tests without a guide element and the distance of 3 to 5 cells can be calculated from the result.

Preferably the lower time, i.e. the earliest time, is when the rising reactive mixture is 10 times the volume of the originally-applied reactive mixture. It is particularly preferred that the lower time be that in which the rising reactive mixture expands to 25 times the volume of the originally-applied reactive mixture.

If the rising, cell-forming reactive plastics material reaches the at least one guide element too early, the reactive mixture will not be sufficiently creamy. In this case, the necessary rotation of the bow wave cannot occur to a sufficient extent and the elimination of the enclosed air does not take place or the stabilization will not be sufficiently progressed, with the result that cells are destroyed by friction and gas pockets are then formed.

If the rising, cell-forming reactive plastics material reaches the at least one intermediate stage too late, there is insufficient time or path for the vertical alignment of the cells after the end of the contact of the reactive mixture with the guide element. This results in premature hardening of the reactive plastics material and the cell structure with the randomly-aligned cells remains.

If, however, the at least one guide element is vertically positioned correctly, the enclosed air is eliminated due to the rotation of the bow wave without the cells being destroyed by friction, and the cells can align themselves perpendicular to the outer layers in the concluding second rise. Such panels are free of voids and distortion and have a very high compressive strength and a very high insulating effect.

All cellular reactive plastics materials, including slowly reactive materials but in particular highly reactive materials, can be produced with the process according to the invention. In particular, the process according to the invention is suitable for the production of sandwich elements of PUR or PIR foams.

In the process according to the invention preferably from 1 to 5, more preferably from 1 to 4 and most preferably from 1 to 3 (e.g., 2), guide elements are employed.

In a preferred embodiment of the process according to the invention, the guide elements can be adjusted for the purposes of exact fine adjustment in their vertical position between the upper and lower outer layers (corresponding to the height H in FIG. 3). In this way, the guide elements can be adjusted to the rise height progression and to the position in which the cell stabilization has sufficiently occurred. In a preferred modification, the guide elements can be adjusted for the exact fine adjustment in their horizontal position, i.e. in the transporting direction of the outer layers (corresponding to the length L in FIG. 3). In this way, the position of the guide elements can be set to the start time of the reactive mixing.

In another preferred embodiment of the present invention, the guide element can be rotated or inclined relative to the horizontal so that the angle can be adjusted preferably positively ($\alpha$) as well as negatively ($\beta$) with respect to the horizontal in order to be able to influence the flow line behavior aligning the cells.

In another preferred modification of the process according to the invention, the guide elements are arranged in a floating manner by spring elements that can act mechanically, hydraulically or pneumatically. The spring forces acting on the rising, cellular reactive plastics material can also be adjusted.

A temperature control of the guide elements is also possible. In this case, a cooling of the lowermost guide element is advisable in order to influence the reaction process in this phase, e.g., to gain time for the air to escape or to shift the time of the consolidation.

In yet a further modification of the process of the present invention, the bow wave of the foam front is blown in with hot air underneath the guide element (FIG. 3). This measure serves to destroy air bubbles occurring on the bow wave so that those air bubbles cannot penetrate the bow wave again.

Suitable guide elements include: flat or curved plate elements, deflection rollers or runners (e.g., for the upper outer layer), or plate elements made up of adjustable segments.

It is also possible for the guide element or elements to be of convex, concave or flat shape over their total length in the transporting direction. It is also possible for the guide elements to be of convex, concave or flat shape only in partial sections and match them to the expansion behavior of the reactive mixture to control in a targeted manner the flow line formation.

The present invention also relates to an apparatus for the continuous production of sandwich elements containing an upper outer layer, a lower outer layer and a layer of cellular reactive plastics material lying between them and securely joined to the outer layers. This apparatus includes a circulating upper belt for guiding the upper outer layer, a circulating lower belt for guiding the lower outer layer, a feed device for the upper outer layer, a feed device for the lower outer layer, a device for cutting the sandwich elements, a mixing head for applying the reactive mixture to the lower outer layer, a metering device for metering the reactive components, as well as lines between the metering device and the mixing head. In this apparatus, at least one guide element extending over the width of the outer layers is arranged between the upper outer layer and the lower outer layer.

In this connection, the at least one guide element is preferably arranged between the outer layers so that the rising reactive mixture reaches the at least one guide element at the earliest when the volume of the reactive mixture applied to the lower outer layer has at least doubled, and reaches the at least one guide element at the latest when the reactive mixture of the upper outer layer has approached a vertical distance that corresponds to the height of 3 to 5 vertically aligned cells.

The invention is described in more detail hereinafter with reference to FIGS. 1, 2 and 3.

FIG. 1 illustrates an apparatus for the production of sandwich elements 1 of cellular reactive plastics material according to the prior art. In this apparatus, a lower outer layer 2 and an upper outer layer 3 are continuously conveyed by corresponding associated feed devices 4 and 5 into the gap extending in the longitudinal direction between the circulating upper belt 7 and the circulating lower belt 6, the so-called forming section (moulding section), and are guided therein.

The polyol component A and the isocyanate component B are conveyed in a metered manner from the respective associated storage tanks 8 and 9 via associated pumps 22, 23 and lines 24, 25 to the mixing head 10, where they are mixed, and the reaction mixture 21 that is thereby formed is applied to the lower outer layer 2 as the mixing head 10 traverses the width of the lower outer layer 2 transverse to the transporting direction.

The reaction mixture 21 applied to the lower outer layer 2 foams and is transported by the longitudinal movement of the lower outer layer 2 to the forming section (moulding section), which is gripped by the circulating upper belt 7 and the circulating lower belt 6 and the outer layers 3 and 2.

In the forming section, the reaction mixture reacts between the upper outer layer 3 and the lower outer layer 2 to form an intermediate layer 20 of cellular reactive plastics material. After passage through the forming section (moulding section), a cellular sandwich element or panel is obtained. This sandwich element or panel can then be cut to length in the cutting device 11, for example a saw, and processed further.

Figure 2:
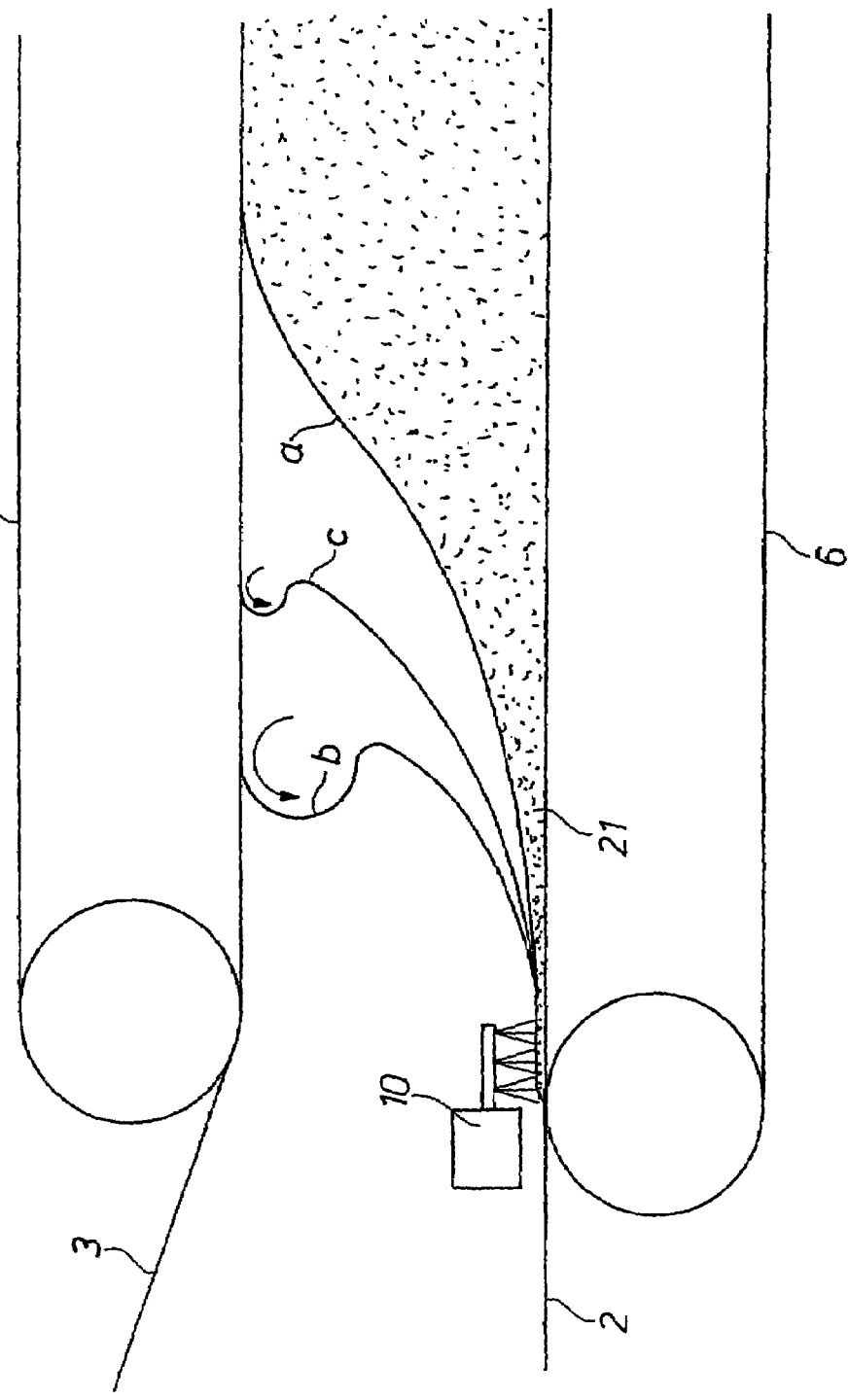
FIG. 2 shows rise curves according to the prior art of cellular reactive plastics material for three different production rates.

FIG. 2 shows rise patterns of cellular reactive plastics material according to the prior art for three different production rates.

Liquid reactive mixture 21 is applied between the upper belt 7 and the lower belt 6 and the associated outer layers 3 and 2 by means of the mixing head 10, which mixture foams and then completely reacts so as to form cellular panels.

Depending on the production rate and the reactivity, which in turn are influenced by the temperature of the raw materials and the ambient temperature, different rise curves are obtained. Rise curve a illustrates an example of a high production rate, i.e. transporting rate, of the outer layers or panels. The rise curve a leads to the formation of voids.

In the case of rise curve b, the transporting velocity is too low. In this case, although voids are avoided, such a rise curve leads to marked overrolls and thus to a cell structure with randomly arranged cells resulting in panels of poorer quality, i.e., panels with reduced compressive strength and reduced insulating effect.

Rise curve c corresponds to the previous practical compromise with respect to production rate. In this case, the void size and the void frequency are minimized, and the thickness of the overroll layer, i.e. the thickness of the panel edge layer in which the cells are randomly arranged, is also minimized. Normal production rates are, depending on the type of equipment (i.e. structural length and thus hardening time) and reactivity, between 8 and 60 m/min. The rate difference between rise curve a and rise curve b is normally between 0.5 and 5% of the production rate for conventional polyurethane systems. With polyisocyanurate systems, the margin may lie significantly below 0.5%, which seriously complicates, or even renders impossible, the reliable adjustment of a practical compromise.

FIG. 3 shows an apparatus for carrying out the process according to the invention in four stages, i.e. with three vertical intermediate stages, which are upwardly bounded by the three guide elements 12, 13, and 14, and the uppermost stage, which is upwardly bounded by the upper outer layer 3.

After the liquid reactive mixture 21 has been applied to the lower outer layer 2, the blowing reaction and cell formation begin, so that the reactive mixture rises.

In the first vertical intermediate stage, which is upwardly bounded by the lowermost guide element 12, a foam front with a bow wave is generated. Rotation of this bow wave eliminates voids. The further vertical intermediate stages, which are upwardly bounded by the guide elements 13 and 14, serve as cell orientation stages. In these stages, the cells which passed the lowermost guide element 12 and were still in a completely random arrangement, are aligned in the flow line direction. After passing the uppermost guide element 14, the flow lines run with the aligned cells perpendicular to the end stage, the upper outer layer 3, where the hardening takes place.

An important feature in the overall process is that the reactive mixture is sufficiently creamy, i.e. the volume of the reactive mixture has significantly increased before it reaches the lowermost guide element 12, and the lowermost guide element 12 is arranged as regards height, length and angular position so that the necessary bow wave can form. In addition, the reactive mixture must be stabilized to such an extent that no cells are destroyed by friction. The further optional guide elements 13 and 14 are arranged in their respective height, length and angular position with respect to the first guide element 12 so that a bow wave can no longer form and the cells can align themselves in the direction of the flow lines. It is also important that the uppermost guide element 14 is positioned in a region in which the reactive mixture 21 is always still completely creamy, so that a sufficient rise path for the vertical alignment of the cells remains and no premature consolidation of the cell structure takes place.

The guide elements 12, 13, and 14 are suspended in each case in articulated connections 15, 16, and 17, so that their angular positions can be changed by means of adjustment devices (not shown). In this connection, positive angular positions $\alpha_1$, $\alpha_2$ as well as $\alpha_3$, but also negative angular positions $\beta_1$, $\beta_2$ as well as $\beta_3$ with respect to the horizontal, may be adjusted.

The height positions $H_1$ and $H_2$ as well as $H_3$ and the length positions $L_1$, $L_2$ as well as $L_3$ can likewise be adjusted by means of adjustment devices (not shown).

Hot air from a hot air reservoir (not shown) is blown by a fan 18 through nozzles 19 onto the bow wave. In this way, any enclosed gas pockets in the creamy reactive mixture are burst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the continuous production of sandwich elements containing (i) an upper outer layer, (ii) a lower outer layer and (iii) a layer of cellular reactive plastics material lying between and securely joined to (i) and (ii) comprising:

(a) a circulating upper belt for guiding (i),
   (b) a circulating lower belt for guiding (ii),
   (c) a feed device for (i),
   (d) a feed device for (ii),
   (e) a device for cutting the sandwich elements, (f) a mix head for applying reactive mixture to (ii), (g) a metering device for metering each reactive component, (h) lines between the metering device and the mix head for conveying reactive component to the mix head and (i) at least one guide element arranged between and extending over the width of (i) and (ii) positioned at a point such that cellular plastics-forming material is creamy before reaching the guide element and at a height, length and angle to cause a bow wave to form.

2. The apparatus of claim 1 in which the guide element can be vertically adjusted.

3. The apparatus of claim 1 in which the guide element can be adjusted in the transporting direction of (i) and (ii).

4. The apparatus of claim 1 in which the guide element can be horizontally inclined and adjusted to a desired angle.

5. The apparatus of claim 1 in which the guide element is supported with at least one mechanically or hydraulically or pneumatically acting spring element.

6. The apparatus of claim 5 in which the spring force of the spring elements can be adjusted.

7. The apparatus of claim 1 which further comprises a device containing at least one channel with at least one nozzle or slit for feeding hot gas which is arranged underneath the guide element.

8. The apparatus of claim 1 in which the guide element is flat, convex or concave in the transporting direction over its entire length or sections thereof.

9. The apparatus of claim 1 in which the guide element has a deflecting roller for (i).

10. An apparatus for the continuous production of sandwich elements containing (i) an unner outer layer, (ii) a lower outer layer and (iii) a layer of cellular reactive plastics material lying between and securely joined to (i) and (ii) comprising:

(a) a circulating upper belt for guiding (i), (b) a circulating lower belt for guiding (ii), (c) a feed device for (i), (d) a feed device (ii), (e) a device for cutting the sandwich elements, (f) a mix head for applying reactive mixture to (ii), (g) a metering device for metering each reactive component, (h) lines between the metering device and the mix head for conveying reactive component to the mix head and (i) at least one guide element arranged between and extending over the width of (i) and (ii) which is vertically positioned between (i) and (ii) in a manner such that rising reactive mixture reaches the guide element no sooner than when the volume of the reactive mixture applied to the lower outer layer has at least doubled, and no later than when the reactive mixture has approached the upper outer layer (i) up to a vertical distance that corresponds to the height of 3 to 5 vertically aligned cells.

* * * * *